Sept. 16, 1930.  E. H. HALL  1,776,151
REGULATING SYSTEM
Filed Sept. 11, 1929
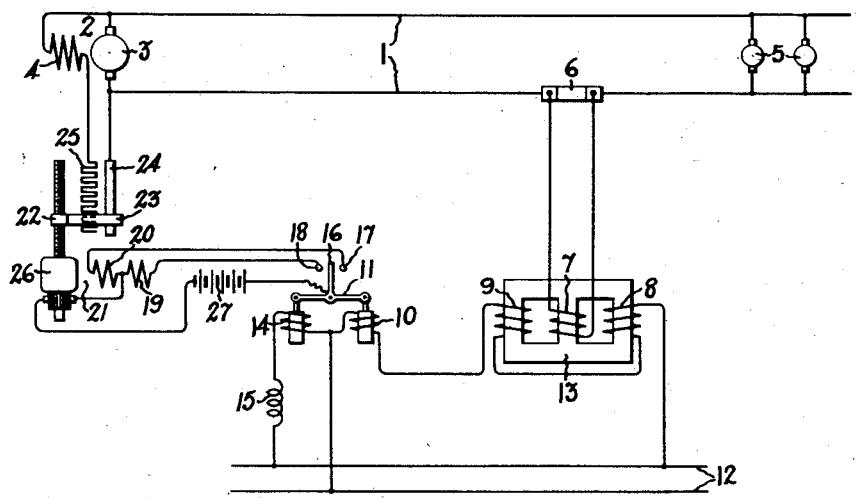
Inventor:
Edward H. Hall,
by *[signature]*
His Attorney.

Patented Sept. 16, 1930

1,776,151

UNITED STATES PATENT OFFICE

EDWARD H. HALL, OF SPRINGFIELD, PENNSYLVANIA, ASSIGNOR TO GENERAL ELECTRIC COMPANY, A CORPORATION OF NEW YORK

REGULATING SYSTEM

Application filed September 11, 1929. Serial No. 391,883.

My invention relates to regulating systems and especially to a system where changes in the electrical conditions of a circuit are amplified and used to operate a regulating device which produces compensatory changes in the original circuit.

An object of my invention is to provide an improved system of regulation.

A further object of my invention is to provide a regulating system for the automatic control of a direct current circuit by the use of a magnetic amplifier and in which an independent alternating current circuit is employed to carry the amplified changes in the direct current circuit for regulatory purpose of the direct current circuit.

My invention will be better understood from the following description taken in connection with the accompanying drawing, and its scope will be pointed out in the appended claims.

Referring now to the single figure of the accompanying drawing, which is a diagrammatic illustration of an embodiment of my invention, 1 represents the conductors of a direct current circuit connected to be energized by a direct current generator 2 having an armature 3 and a shunt field winding 4. Load devices 5, shown as motors are connected to be energized from the conductors 1. A suitable current shunt 6 is connected in series relation with one of the conductors 1 in order to afford a convenient means to energize the controlling means in accordance with the current traversing the direct current circuit. A coil 7 is arranged to control the degree of saturation of an iron-cored reactance and as shown is wound on the center leg of a three-legged iron core 13, similar in shape to the core of a shell-type transformer. The coil 7 is connected to be responsive to the current traversing the circuit 1 and as shown is connected across the shunt 6, but it will be obvious to those skilled in the art that the coil 7 may be connected to be energized in accordance with the voltage of the circuit 1 without departing from my invention in its broader aspects. The outer legs of core 13 have coils 8 and 9 wound upon them, these coils being connected in series with each other and with coil 10 of a balanced alternating current relay 11 across a source of substantially constant alternating current indicated by the conductors 12. Coils 8 and 9 are so connected that their respective magnetomotive forces are additive around the outer loop of the core 13 so as to prevent any transformer action with the direct current winding 7 as a secondary. Coils 7, 8 and 9 are also designed to keep the outer loop of the core 13 near the point of saturation. The other coil 14 of the balanced alternating current relay 11 is connected in series with reactance 15 across the alternating current line 12. Reactance 15 is designed to be equal in magnitude to the reactance of coils 8 and 9, so that for slight frequency variations in the alternating current supply 12 the relay 11 will not be unbalanced. The purpose of connecting both coils 10 and 14 of balanced relay 11 across the alternating current supply line 12 is to make the balance independent of voltage fluctuations in the supply 12. Relay 11 is equipped with a pivoted movable contact 16 and fixed cooperative contacts 17 and 18, connected respectively to series field windings 19 and 20 of motor 21, whose armature shaft is threaded. Cooperating with the thread on the shaft of motor 21 is a nut 22 connected to a slidable contact 23 bridging a strip contact 24 and a resistance 25 in series with field winding 4 of generator 3.

The operation of the system is as follows: If the current through the direct current circuit 1 should decrease below a predetermined value, the change will be communicated to coil 7, although reduced in magnitude because of shunt 6. The decrease in current in coil 7 decreases the degree of saturation of core 13 and hence increases the reactance in the circuit containing coil 10. The relay 11 thus becomes unbalanced causing contacts 16 and 18 to touch, which completes a circuit through battery 27, field 19 and armature 26 of motor 21. This causes the motor 21 to operate in a direction to raise brush 23 through the vertical movement of sliding nut 22. As brush 23 rises it short circuits an increasing proportion of resistance 25, which increases the strength of field 4 of generator 2, thus raising its terminal voltage and the current in circuit 1. As this current increases, the current in coil 7 increases, increasing the saturation of core 13, decreasing the reactance in the circuit of coil 10 until relay 11 becomes balanced when the circuit of motor 21 is broken. Similarly, if the current in the direct current circuit rises above a predetermined value, relay 11 becomes unbalanced in the opposite direction, closing the circuit to motor 21 through the reversing field 20, which has the effect of adding resistance to the field circuit of generator 2 and hence decreasing the voltage and current in the direct current circuit until another balance of relay 11 is obtained. It will be noted that the regulating means functions as a load limiting means for the load devices 5, as well as to maintain a predetermined current in the circuit as previously described.

While I have shown and described a particular embodiment of my invention it will be obvious to those skilled in the art that changes and modifications may be made without departing from my invention and, I, therefore, aim in the appended claims to cover all such changes and modifications as fall within the true spirit and scope of my invention.

What I claim as new and desire to secure by Letters Patent of the United States is:

1. In combination, a direct current load circuit including a source of direct current, a second circuit containing a substantially constant source of alternating current which is independent of said direct current source, a reactance included in said alternating current circuit, means included in said alternating current circuit for controlling an electrical condition of said direct current circuit, and means responsive to variations in said electrical condition of said direct current circuit for varying the impedance of said reactance to control said means included in said alternating current circuit.

2. In combination, a direct current load circuit containing a source of direct current, means for varying an electrical condition of said source, an alternating current circuit containing a source of alternating current which is independent of said direct current source, means in said alternating current circuit for controlling the operation of said condition varying means, a current amplifying means having an input circuit containing means responsive to changes in an electrical condition of said direct current circuit and an output circuit which is in said alternating current circuit.

3. In a regulating system for maintaining a substantially constant electrical condition in a direct current circuit comprising means in said circuit for varying the above mentioned electrical condition, an alternating current circuit comprising a source of alternating current which is independent of said direct current circuit, means in said alternating current circuit for controlling the operation of said condition varying means, and a current amplifying means whose input circuit contains means responsive to changes in the electrical condition of the direct current circuit and whose output circuit is in said alternating current circuit.

4. In a regulating system for maintaining a substantially constant electrical condition in a direct current circuit in which said electrical condition is inherently subject to change comprising means in said circuit for compensating for said change in condition, an alternating current circuit comprising a source of alternating current which is independent of said direct current circuit, means in said alternating current circuit for controlling the operation of said compensating means, and a current amplifying means whose input circuit contains means responsive to the changes in the electrical condition of the direct current circuit and whose output circuit is in said alternating current circuit.

5. In a system for maintaining a substantially constant current in a direct current load device, a direct current circuit, a load device in said circuit, means for varying the voltage of said circuit, an alternating current circuit containing a source of alternating current which is independent of said direct current circuit, means in said alternating current circuit responsive to current changes therein for controlling the voltage regulating means of said direct current circuit, and means responsive to slight current variations in said direct current circuit for changing the magnitude of the reactance in said alternating current circuit so as to effect a compensatory change in voltage in said direct current circuit.

6. In a system for amplifying slight current changes in a circuit and employing the amplified current to produce compensatory changes in the voltage of said circuit so as to maintain a substantially constant current therein comprising a circuit, means in said circuit tending to vary the current therein while the potential thereof is constant, means also in said circuit for varying the voltage of said circuit, a magnetic current amplifier, means for connecting the input circuit of said current amplifier to said first mentioned circuit in such a way that the current therein is proportional to the current in said first mentioned circuit, a source of alternating current and relay means responsive to current changes therein, for causing the voltage regulating means in the first mentioned circuit to produce compensatory changes therein, said source and said relay means being connected in the output circuit of said current amplifying means.

In witness whereof, I have hereunto set my hand this 3rd day of September, 1929.

EDWARD H. HALL.